United States Patent [19]

Clements

[11] Patent Number: 5,713,743
[45] Date of Patent: Feb. 3, 1998

[54] STORYTELLING FLIP OVER PICTURE BOOK AND METHOD OF PROVIDING AND PRESENTING A STORY

[76] Inventor: Jehan Clements, P.O. Box 543, Tarrytown, N.Y. 10591

[21] Appl. No.: 608,439

[22] Filed: Feb. 28, 1996

Related U.S. Application Data

[63] Continuation-in-part of Ser. No. 951,356, Sep. 25, 1992, abandoned, which is a continuation of Ser. No. 684,004, Apr. 11, 1991, abandoned.

[51] Int. Cl.⁶ ..................... G09B 25/00
[52] U.S. Cl. .............. 434/428; 281/15.1; 281/33; 283/63.1
[58] Field of Search ............... 434/167, 178, 434/317, 365, 368, 402, 404, 428, 416, 347; 40/119, 121; 281/15.1, 33; 283/63.1

[56] References Cited

U.S. PATENT DOCUMENTS

| | | |
|---|---|---|
| 289,933 | 12/1883 | Reynolds . |
| 1,263,664 | 4/1918 | Hanada . |
| 1,353,371 | 9/1920 | Winslow . |
| 1,385,623 | 7/1921 | Kellogg . |
| 1,405,134 | 1/1922 | Hoyme . |
| 1,563,582 | 12/1925 | McDade . |
| 2,433,540 | 12/1947 | Wright . |
| 2,544,568 | 3/1951 | Shepherd . |
| 2,867,917 | 1/1959 | Carlton . |
| 3,091,482 | 5/1963 | Cirgliano . |
| 3,263,347 | 8/1966 | McCutcheon . |
| 3,417,490 | 12/1968 | Chuy . |
| 3,562,923 | 2/1971 | Chuy . |
| 3,738,686 | 6/1973 | Morse .................. 283/63 |
| 4,419,080 | 12/1983 | Erwin .................. 434/172 |
| 4,515,566 | 5/1985 | Sprague .................. 434/172 |
| 4,606,554 | 8/1986 | Lederman .................. 281/15.1 |
| 4,877,269 | 10/1989 | Callaghan et al. .................. 283/40 |
| 4,878,844 | 11/1989 | Gasper . |
| 4,950,167 | 8/1990 | Harris . |
| 5,033,964 | 7/1991 | Phelps .................. 434/113 |

FOREIGN PATENT DOCUMENTS

| | | | |
|---|---|---|---|
| 132767 | 9/1919 | United Kingdom | 281/15.1 |

*Primary Examiner*—Jeffrey A. Smith

[57] ABSTRACT

A selected number of pages are arranged in book-like fashion and bound together so that the book may be disposed either with the pages flat on a support or in easel-like disposition. A first side of one of the pages is disposed in proximity to a second side of an adjacent page when the book-like arrangement is in a closed condition. The first side of each page carries an illustration or picture of a portion of a story with each successive first side carrying another illustration or picture of another portion of the story, so that the first sides taken as a set illustrate substantially the entire story. The second sides of each page carries a copy of the illustration or picture on the adjacent first page and also carries textual material for the story correlated to the illustrations. The pages are disposed so that the person listening to the story sees the first sides and their respective illustrations or pictures while the storyteller or reader sees the second page sides and the illustration or picture and corresponding text corresponding to the first page side viewed by the listener. Other pages and materials may also be included.

30 Claims, No Drawings

STORYTELLING FLIP OVER PICTURE BOOK AND METHOD OF PROVIDING AND PRESENTING A STORY

REFERENCE TO RELATED APPLICATIONS

This application is a continuation-in-part of U.S. application Ser. No. 07/951,356 filed Sep. 25, 1992, now abandoned, which is a continuation of U.S. application Ser. No. 07/684,004 filed Apr. 11, 1991, now abandoned.

BACKGROUND OF THE INVENTION

This invention relates to books and the like; and more particularly, to books and the like utilized by a person or persons to tell or relate a story to another person or group of persons.

Many people read stories from books to other people; or tell or describe a story that may be illustrated in a book to one or more other people. Quite often the listener or person or persons to whom the story is being told or read is relatively young, maybe too young to know how to read; and the storyteller or reader is older, possibly a parent, older sibling or relative, or a teacher. There are many reasons to tell stories and/or read to young children. Storytelling and reading serve to occupy the child's time and facilitate teaching the child to recognize letters, words, objects, persons, places, colors, things and the like. In time, storytelling and reading will help the child learn to read themselves and to develop an imagination.

Thus books and other things may often combine graphic illustrations, in color in many instances, and related words to provide a more interesting experience for the young child. Even toys, such as that shown in U.S. Pat. No. 2,433,540 issued on Dec. 30, 1947 to J. H. Wright for Humpty Dumpty Break-Up Toy may be formed graphically and with words. However, such relatively bulky items are more suitable to hand-type game activity than to person-to-person storytelling and may, in fact, distract the child to whom the story is being read or told and thus interfere with the reading or storytelling. Graphics and words are also combined on cards to provide a learning experience in an interactive setting. The Game Cards of U.S. Pat. No. 1,263,664 issued on Apr. 23, 1918 to T. E. Hanada, for example, shows sets of game cards with pictures of persons on one side of the card and sayings on the other side of the card related to the person pictured on the card. However, cards quite often get separated from the deck, and possibly lost and are often not in any predetermined order. Thus, such card games are not suitable for book type reading and/or storytelling.

It is also known to associate a set of cards with a device or machine so that one person may successively or otherwise display the cards for viewing by another person, usually in a testing situation. However, such arrangements, as shown for example in U.S. Pat. No. 1,385,623 issued on Jul. 26, 1921 to J. L. Kellogg for Kindergarten Apparatus; in U.S. Pat. No. 3,417,490 issued on Dec. 24, 1968 to R. G. Chuy et al for Flash Card Apparatus; in U.S. Pat. No. 3,263,347 issued on Aug. 2, 1966 to L. A. McCutcheon for Educational And Recreational Lesson-Aids And Games With Easel; and in U.S. Pat. No. 3,562,923 issued on Feb. 16, 1971 to R. G. Chuy et al for Educational Aid Viewing Apparatus, require the use of both a set of cards and a machine or device to position and move the cards and thus add to the cost and complexity of utilizing the cards and also present cards which do not tell a story or facilitate telling a story and do so in an environment which is not necessarily conducive to story telling or reading.

Flash card type arrangements are also provided for use in book form as well as the device and machine set-ups described above. One such book form use is shown and described in U.S. Pat. No. 4,950,167 issued on Aug. 21, 1990 to J. A. Harris for Visual Detail Perception Test Kit And Methods Of Use wherein cards, or large pages, are mounted in a loose-leaf type binder so that one viewer, in this case a tester, can utilize the indicia on one page while the other viewer, the testee, can utilize the indicia on the corresponding next, opposite, or facing page. While the indicia on each set of cooperating pages in the Harris test kit are related, they do not show, teach or even suggest a story that is to be read by one party to another. The Harris test kit is just that; a test kit and nothing more. Similarly, the Woodcock-Johnson Psycho-Educational Battery by Teaching Resources Corporation utilizes a bound book-type holder for successive cards or pages so as to present a first page with a graphic and a related but incomplete sentence to a test taker and a second page with a substantially identical graphic and the same incomplete sentence to a tester and with teaching aids on the testers page. This test kit is also a compilation of separate and distinct two-page sets—each presenting a test but not cooperating with each other to do any more than present separate and distinct test sets.

U.S. Pat. No. 1,563,582 issued on Dec. 1, 1925 to J. E. McDade for Silent Reading Story Illustrating Arrangement presents a storybook and related base upon which a party, the listener or reader, may set up graphics related to the story of the book. The McDade device thus requires a book, a number of cut-outs and a base constructed to receive the cut-outs. The arrangement is relatively cumbersome and bulky, and the cut-outs may be easily lost. In U.S. Pat. No. 1,405,134 issued on Jan. 31, 1922 to C. R. Hoyme for Book there is shown a bound book with printed text on one page and an open top pocket on the facing page. A cut-out illustration is received in the pocket. Here again, the cut-out illustration, being separate and relatively thick to facilitate its removal from the pocket for use, may be lost thus defeating the purpose of book text and illustration. In addition, the relative thickness of the illustration and its pocket renders the book relatively thick and bulky for a given size story. In addition, neither the McDade book nor the Hoyme book are conducive for easy storytelling and reading by one person, preferably an adult, to another person or a young child. More importantly, the removal of items from the Hoyme book and the setting up of the McDade Scene may so distract the listener as to exasperate the storyteller or reader.

SUMMARY OF THE INVENTION

It is therefore an object of this invention to provide a new and improved storytelling aid.

It is another object of this invention to provide a new and improved reading aid.

It is yet another object of this invention to provide a new and improved storytelling book.

It is still another object of this invention to provide a new and improved storytelling and reading book.

It is yet still a further object of this invention to provide a new and improved storytelling and reading aid in wire, spiral or loose-leaf bound book form that facilitates reading or telling of a story to a young child by an older person.

Other objects, features and advantages of the invention in its details of construction and arrangement of parts will be seen from the above, from the following description of the preferred embodiment and from the appended claims.

DESCRIPTION OF THE PREFERRED EMBODIMENT

For convenience, there is generally described a book with a number of leaves or pages upon a number of which is graphically printed and illustrated a story, usually without words, and upon a corresponding number of which is printed the graphics of the story and text related to the story and the telling of the story. The book is bound by a plastic spine to facilitate the easy turning of the leaves or pages and the standing up of the book in easel-like configuration and also to facilitate reading and telling of the story and use of the book. It should be understood, nevertheless, that other forms of reproduction of the graphics and text besides printing may be utilized, that the book may be bound together by wire, plastic, rings or other suitable and appropriate means that facilitate turning of the pages and that the book may be utilized flat down as well as in easel-like configuration.

A storytelling book incorporating the instant invention includes a plurality of leaves or pages numbered 12, 14, 16, 18, 20, 22, etc., conventionally bound together as by conventional plastic loops carried by a spine and in a manner that facilitates mining of pages 12–22 as well as the disposition of the storytelling book in either a flat configuration, or in an easel-like configuration. A front cover and a back cover may be provided for the storytelling book. The covers may be of the same stock as that of pages 12–22 or of different stock and may be of the same size as page 12–22 or slightly larger as conventionally done for many books.

Pages 12–22 each include a first or facing side 12a, 14a, 16a, 18a, 20a, 22a, 24a, 26a etc., and a second or back side 12b, 14b, 16b, 18b, 20b, 22b, 24b, 26b, etc., Each "a" side includes a graphic or illustration illustrating a portion of a story with the set of "a" sides on pages 12, 14, 16, 18, 20, 22, etc., together and successively illustrating the story; preferably without words or printed text. Each "b" side includes a graphic or illustration forming a set on pages 12, 14, 16, 18, 20, 22, etc., with the graphics or illustrations on side being identical, or closely corresponding, to the facing page graphic or illustration on side "a" of the pages. The graphics or illustrations on side "b" of the pages are preferably of a proportionally reduced size the graphics or illustrations on side "a" of the page. Thus the graphic on side "b" of page 18 is most preferably identical to graphic the graphic on side "a" of page 16 but of a reduced size and the graphic on side "b" of page 16 is most preferably identical to graphic the graphic on side "a" of page 14, etc.

The graphics or illustrations on side "a" of the pages are preferably sized to encompass substantially their entire page and are preferably in color but may be in black and white, or otherwise, as long as the graphics on side "a" of the pages depict the intended story and do so in successive panels in the sequence of the story to be told or read. The graphics or illustrations on side "b" of the pages are identical or closely corresponding to their respective and corresponding graphics on side "a" of the pages as described above, are disposed on a facing page to their corresponding graphic on side "a" of the pages (in the closed condition of the storytelling book), are preferably sized smaller than the corresponding graphics on side "a" of the pages and are preferably disposed in the center of the respective pages or the lower right quadrant of their respective pages. The pages carrying the graphics on side "b" of the pages also carry textual material The textural material may constitute the portion of the story corresponding to the corresponding graphics [i.e. the textural material on side "b" of page 16 corresponds and relates to the graphics on side "b" of pages 16 and the graphics on side "a" of page 14 and the textural material on side "b" of page 18 corresponds and relates to the graphics on side "b" of page 18 and the graphics on side "a" of page 16]. The textural material is preferably disposed above the graphics on side "b" of the pages across the top of the page and preferably starts in the upper left quadrant of the page as looked at by the reader. Such textual material may extend across the top of the graphic on side "b" of the pages and if desired along its side. In addition the textual material may include questions for the listener pertinent to the story line to assist the reader or storyteller or other pertinent material or information for the reader or storyteller.

Additional pages may be bound into the storytelling book by the binding and other information, textual material, questions, hints, aids and the like included thereon.

In use the storyteller or reader preferably places the storytelling book in easel-like configuration with page sides "a" containing the full page graphics or illustrations facing the listener. As such page sides "b" containing the corresponding reduced size graphics or illustration will face the storyteller or reader as will the corresponding textual material. The reader or storyteller then starting at the beginning (say page 12) will begin the story with page 12a and the graphic on side "a" of page 12 facing the listener and page 14b, the graphic and test on side "b" of page 14 facing the reader. The graphic and test on side "b" of page 14 will correspond to the graphic on side "a" of page 12 and the storyteller can start the story. The storyteller will then proceed and turn page 14 about the binder 30 until it is disposed with its side 14b against side 12a and will read the text on side "b" of page 16 while observing the graphic on side "b" of page 16 and while the listener looks at the graphic on side "a" of page 14. Upon turning page 16 the graphic on side "a" of page 16 will be disposed to face the listener and the graphic and texture material on side "b" of page 18 will face the storyteller or reader. This disposition, where the reader and the audience can each see the material on the page sides facing of them in the proper orientation for reader and viewing, respectively, is known as 'diametric contraposition'. The storyteller or reader thus continues until the story and related questions and other text material are finished.

If desired, the storytelling book may be used as described above but with its pages flat on a surface. The storytelling book may also be used held in the lap of the reader, with page sides "b" facing up for reading and page sides "a" hanging down over the knees of the reader and thus facing the audience.

From the above description it will thus be seen that there has been described a new and improved storytelling book which permits the listener to observe graphic illustrations of each successive portion of a story while presenting to the storyteller or reader the same or corresponding graphics but on a reduced scale accompanied by related text.

There is an educational technique that requires the placement of text and corresponding picture from a story, in close proximity on the same page, so that an audience of listeners may see the picture and also see text that is identical to, or related to, the text being read out loud to them by a reader. The present invention also encompasses a storytelling book reflecting this technique. In a storytelling book reflecting this technique, textural material is disposed across page 24a with a graphic on side "a" facing the listener and page 26b having a graphic and text on side "b" facing the reader. The graphic and text on side "b" of page 26 will correspond the to the graphic on side "a" of page 24. Any combination of pictures and text on the page facing the audience is within the scope of the present invention so long as an identical or closely corresponding picture, and a predetermined amount of text corresponding to the reader's picture, are on the page facing the reader. The text on the page facing the audience may, but need not, be identical to the text facing the reader. Similarly, the picture on the page facing the reader may, but need not, be of smaller size than the picture on the adjacent page facing the audience. As used herein, the term "picture" encompasses any type of graphics or illustration, or other forms of visual media, which is preferably but not necessarily without words or printed text.

It is understood that although there has been described a preferred embodiment of the invention that various modifications may be made in the details thereof without departing from the spirit as comprehended by the following claims.

What is claimed is:

1. The method of a reader presenting and reading out loud a story to a person or persons forming an audience for the reader comprising:
   (a) providing the reader with a storytelling flip-over picture book;
   (b) providing said book with a plurality of page means, each page means having a first side and a second side;
   (c) providing binder means for binding at least the plurality of page means in a book-like arrangement with a first side of one of the page means disposed adjacent to a second side of an adjacent page means in a closed condition of said book arrangement and so that when said book is to be read out loud by a reader to an audience each said page means may assume at least a first position or a second position;
   (d) providing at least one picture upon each of said first sides of said page means and so that said first sides of said page means together constitute a first set;
   (e) providing at least one picture and at least a predetermined amount of text upon each of said second sides of said page means and so that said second sides of said page means together constitute a second set;
   (f) providing each said picture of each said second side of said page means so as to be identical in content to at least said one picture of said first side of said adjacent page means when said plurality of page means are disposed in said book-like arrangement;
   (g) orienting each said picture on its respective said first side of said page means so that when in said first position said first side of said page means faces the audience;
   (h) orienting each said picture and text on its respective said second side of said adjacent page means so that when in said second position said second side of said page means faces and is read by the reader; and
   (i) wherein said book is read out loud by said reader.

2. The method recited in claim 1 wherein the step of providing each said picture on each said first page means includes providing only a single picture.

3. The method as recited in claim 1 wherein said first position includes placing said book-like arrangement upon a relatively flat surface.

4. The method as recited in claim 1 wherein said first position includes placing said book-like arrangement in an easel-like disposition.

5. The method as recited in claim 4 wherein said step of providing pictures carded by said second sides of said page means includes providing same as exact reproductions, but on a smaller scale, of said picture carried by said first side of said adjacent page means.

6. A storytelling flip-over picture book of the type wherein a reader reads from the book to at least one other person as an audience of the reader, said book comprising:
   (a) a plurality of page means, each page means having a first side and a second side;
   (b) binder means binding at least said plurality of page means in a book-like arrangement with a first side of one of said page means disposed in proximity to a second side of an adjacent page means in a closed condition of said book-like arrangement and so that each of said page means may assume at least a first disposition or a second disposition;
   (c) said first sides of said page means each carrying at least one picture and together constituting a first set;
   (d) said second sides of said page means each carrying at least one picture and at least a predetermined amount of text and said second sides together constituting a second set;
   (e) said at least one picture of each said second sides of said page means of said second set being identical in content to said at least one picture of said first side of said adjacent page means when said plurality of page means are disposed in said book-like arrangement;
   (f) said picture of each said second sides and said picture of said first side of said adjacent page means being disposed in diametric contraposition such that with said book being disposed between the reader and the audience, said first and second sets being capable of being disposed so that the reader sees said picture and text of said second set oriented for reading and the audience, while facing the reader, sees said picture in said first set; said picture in said first set has the same orientation to the audience as said picture in said second set has to the reader.

7. The book of claim 6, wherein said first disposition of said page means in said book-like arrangement is relatively flat.

8. The book of claim 6, wherein said second disposition of said page means in said book-like arrangement is in an easel-like disposition with said second set being capable of being disposed to face the reader on one side of said easel and said first set being capable of being disposed to face the audience on the other side of said easel.

9. The book of claim 6, wherein said first sides of said page means each only carry a single picture.

10. The book of claim 9, wherein said pictures of said first sides of said page means each relate and correspond to and illustrate a particular portion of a story.

11. The book of claim 10, wherein said pictures of said first sides of said page means together correspond to and relate to and illustrate substantially an entire story.

12. The book of claim 11, wherein said first sides of said page means are arranged in said book-like arrangement so that the respective pictures follow in order of the respective story.

13. The book of claim 10, wherein each said picture of said second sides of said page means are a reduced size duplicate of the respective picture of said first side of an adjacent and facing page means in said book-like arrangement of said page means.

14. The book of claim 13, wherein said text disposed upon a respective second side of said page means relates to said picture disposed thereon.

15. The method of presenting a story in a book for being read out loud by a reader to a person or persons forming an audience for the reader, comprising:

(a) providing a plurality of page means, each page means having a first side and a second side;

(b) providing binder means for binding at least the plurality of page means in a book-like arrangement with a first side of one of said page means disposed adjacent to a second side of adjacent page means in a closed condition of the book-like arrangement and so that when the book-like arrangement is to be read out loud by a reader to an audience each page means may assume at least a first disposition or a second disposition;

(c) providing at least one picture upon each of said first sides of said page means and so that said first sides together constitute a first set;

(d) providing at least one picture and at least a predetermined amount of text upon each of said second sides of said page means and so that said second sides together constitute a second set;

(e) providing that said picture and said text of each said second side of said page means to be identical in content to at least said one picture of said first side of said adjacent page means when said plurality of page means are disposed in said book-like arrangement;

(f) orienting each picture on its respective first side of said page means so that when in said first position said page means may be facing the audience;

(g) orienting each picture and text on its respective second side of said adjacent page means so that when in said second position said page means may be facing the reader; and (h) placing said book so that said respective pictures may be seen by the audience and the reader with the reader and the audience facing one another with said book between the reader and the audience.

16. The method of presenting a story in a book as recited in claim 15 wherein the step of providing each said picture on each said first page means includes providing only a single picture.

17. The method of presenting a story in a book as recited in claim 16 wherein the step of providing pictures on each said first sides of each said page means includes providing pictures relating and corresponding to and illustrating a particular portion of a story.

18. The method of presenting a story in a book as recited in claim 17 wherein the step of providing text includes providing text relating to the picture.

19. The method of presenting a story in a book as recited in claim 15 wherein said step of providing pictures carried by said second sides of said page means includes providing same as exact reproductions but on a smaller scale of said pictures carried by said first side of an adjacent page means.

20. The method recited in claim 19 wherein the step of providing pictures on each said first sides of each said page means includes providing pictures relating and corresponding to and illustrating a particular portion of a story.

21. The method recited in claim 20 wherein the step of providing text includes providing text relating to said picture.

22. The method of presenting a story in a book as recited in claim 15 wherein said first disposition means includes placing said book-like arrangement upon a relatively flat surface.

23. A storytelling book of the type wherein a reader reads out loud from the book to at least one other person as an audience of the reader, said book comprising:

a) a plurality of page means, each page means having a first side and a second side;

b) a binder means binding at least said plurality of said page means in a book-like arrangement with a first side of one of said page means disposed in proximity to a second side of an adjacent page means in a closed condition of said book-like arrangement and so that each of said page means may assume at least a first disposition or a second disposition;

c) said first sides of said page means each carrying at least one picture and a predetermined amount of text and said first side together constituting a first set;

d) said second sides of said page means each carrying at least one picture and at least a predetermined amount of text and said second side together constituting a second set;

e) said at least one picture of each of said second sides of said page means of said second set being identical in content to said at least one picture of said first side of said adjacent page means when said plurality of said page means are disposed in said book-like arrangement;

f) said first side of said page means facing the audience when said page means are in said first disposition, and said second sides of said page means facing the reader when said page means are in a second disposition.

24. The storytelling book of claim 23 wherein said at least a predetermined amount of text on said first sides of said page means of said first set is identical in content to at least a predetermined amount of text on said second sides of said page means of said second set.

25. The storytelling book of claim 23 wherein said at least one picture carded by said first side of said page means covers substantially all of said page means.

26. The storytelling book of claim 23 wherein said text carried by said first side of said page means is in a predetermined location substantially below said picture on said page means.

27. The storytelling book of claim 23 wherein said picture carried by said second side of said page means is an exact reproduction but on a smaller scale of said picture carried by said first side of said adjacent page means.

28. A method of providing a story within a book for a reader to read out loud to at least one person forming an audience for the reader comprising:

a) providing said reader with a storytelling book having a plurality of page means, each page means having a first side and a second side;

b) providing a binder means for binding at least the plurality of said page means in a book-like arrangement with said first side of said page means disposed adjacent to said second side of an adjacent page means in a closed condition of said book-like arrangement so that when said book is to be read out loud by a reader to an audience each said page means may assume a first position or a second position;

c) providing at least one picture and a predetermined amount of text upon each of said first sides of said page means; said first sides of said page means together constituting a first set;

d) providing at least one picture and at least a predetermined amount of text upon each of said second sides of said page means; said second sides of said page means together constituting a second set;

e) providing that at least one picture of said second side of said page means be identical in content to at least one picture of said first side of said adjacent page means;

f) orienting said picture and said predetermined amount of text on said first side of said page means so that when in said first position said first side of said page means faces the audience;

g) orienting said picture and said predetermined amount of text on said second side of said adjacent page means so that when in said second position said second side of said page means faces the reader;

h) providing that said picture and said predetermined amount text on said second sides of said page means and said picture on said first side of said page means relates to, corresponds to, and illustrates a particular portion of the same story.

29. The method of claim 28 wherein said book-like arrangement is disposed upon a flat surface between the reader and the audience.

30. The method of claim 28 wherein said book-like arrangement is disposed in an easel-like disposition between the reader and the audience.

* * * * *